US011478930B2

(12) United States Patent
McDaniel (10) Patent No.: US 11,478,930 B2
(45) Date of Patent: Oct. 25, 2022

(54) SIMULATION ASSISTED PLANNING OF MOTIONS TO LIFT HEAVY OBJECTS

(71) Applicant: Siemens Aktiengesellschaft, Munich (DE)

(72) Inventor: Richard Gary McDaniel, Hightstown, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 428 days.

(21) Appl. No.: 16/533,844

(22) Filed: Aug. 7, 2019

(65) Prior Publication Data
US 2020/0061820 A1    Feb. 27, 2020

(30) Foreign Application Priority Data
Aug. 24, 2018 (EP) ..................................... 18190702

(51) Int. Cl.
*B25J 9/16*    (2006.01)

(52) U.S. Cl.
CPC ............. *B25J 9/1664* (2013.01); *B25J 9/163* (2013.01); *B25J 9/1605* (2013.01); *B25J 9/1671* (2013.01)

(58) Field of Classification Search
CPC ...... B25J 9/1605; B25J 9/1671; B25J 9/1664; B25J 9/163; G05B 2219/40453; G05B 2219/40466
See application file for complete search history.

(56) References Cited

U.S. PATENT DOCUMENTS 5,043,929 A * 8/1991 Kramer .................. G06F 30/17
                                                    703/1
9,687,982 B1 * 6/2017 Jules ...................... B25J 9/1612
(Continued)

FOREIGN PATENT DOCUMENTS

CN    104010774 A    8/2014
CN    106444740 A    2/2017
CN    108413976 A    8/2018

OTHER PUBLICATIONS

Chiddarwar; "Optimal trajectory planning for industrial robot along a specified path with payload constraint using trigonometric splines"; Int. J. Automation and Control; vol. 6, No. 1; 2012; p. 39-65 (Year: 2012).*
EP Search Report dated Mar. 15, 2019; European patent application 18190702.3; Filing Date: Aug. 24, 2018; 12 pages.
(Continued)

*Primary Examiner* — Stephen Holwerda (57) ABSTRACT

According to other embodiments, a method planning of motions to lift heavy objects using a robot system comprising a robot and an end effector, includes identifying data comprising (a) rigid bodies included in the robot and the end effector, (b) joints connecting the rigid bodies, and (c) torque limits for each of the joints. The torque limit for a joint indicates a maximum supported torque by a drive operating the joint. A motion path searching algorithm is applied to the input data to identify feasible robot paths. The motion path searching algorithm determines torque of each of joint when evaluating points for inclusion in a feasible robot path. An evaluated point is only included in a feasible robot path if the torque of each of the joints do not exceed the torque limits. At least one of the feasible robot paths is transferred to a controller associated with the robot.

16 Claims, 4 Drawing Sheets

(56) References Cited

U.S. PATENT DOCUMENTS

| | | | |
|---|---|---|---|
| 9,701,019 B2 | 7/2017 | Eberst et al. | |
| 2007/0135933 A1* | 6/2007 | Panesse | B25J 9/1671 |
| | | | 700/17 |
| 2008/0114492 A1* | 5/2008 | Miegel | B25J 9/1664 |
| | | | 901/6 |
| 2014/0088949 A1* | 3/2014 | Moriya | B25J 9/1612 |
| | | | 703/22 |
| 2014/0358505 A1* | 12/2014 | Hashash | G06F 30/23 |
| | | | 703/2 |
| 2014/0371905 A1* | 12/2014 | Eberst | G05B 19/4182 |
| | | | 700/253 |
| 2015/0220666 A1* | 8/2015 | McDaniel | G06F 30/20 |
| | | | 703/7 |
| 2016/0332297 A1* | 11/2016 | Sugaya | G06F 3/04842 |

OTHER PUBLICATIONS

Kehoe Ben et al; "A Survey of Research on Cloud Robotics and Automation"; IEEE Transactions on Automation Science and Engineering; vol. 12; No. 2; Apr. 1, 2015; pp. 398-409; XP55560748; ISSN: 1545-5955; DOI: 10.1109/TASE.2014.2376492.

Boyacioglu Burak et al; "Time-optimal Smoothing of RRT-given Path for Manipulators"; Proceedings of the 13th International Conference on Informatics in Control, Automation and Robotics; Jan. 1, 2016; pp. 406-411; XP55560730; DOI: 10.5220/0005984504060411; ISBN: 978-989-7581-98-4.

Chiddarwar Shital S. et al; "Optimal trajectory planning for industrial robot along a specified path with payload constraint using trigonometric splines"; International Journal of Automation and Control; vol. 6; No. 1; Jan. 1, 2012; p. 39; XP055560719; ISSN: 1740-7516; DOI: 10.1504/IJAAC.2012.045439.

\* cited by examiner

SIMULATION ASSISTED PLANNING OF MOTIONS TO LIFT HEAVY OBJECTS

TECHNICAL FIELD

The present disclosure relates generally to methods, systems, and apparatuses related to the planning of motions to lift heavy objects using a simulation of the physical system. The disclosed techniques may be applied to, for example, to derive load-dependent robotic motion paths for use in industrial applications.

BACKGROUND

When a machine lifts a heavy object, it causes strain on its various joints and moving parts. In cases where a device has many joints, the strain is magnified where the moment of inertia is greatest. Common control methods for finding a path, such as for a robotic arm, do not consider the mass or inertia of the parts being manipulated. The speed of motion and the path of the device's components are planned based on minimal movement at a high speed. Moving too quickly or in the wrong direction causes problems because the torques on the joints can be too high. This can cause undue wear from the stress on the device or perhaps even break the device.

In the current industry practice, the user of the device is given the responsibility to design motion paths that do not break the joints. The user may use Computer Automated Design (CAD) tools to estimate through simulation the torques on the joints or possible vibrations. However, it is not always known at design time how a device may be employed in the field. The work products may be heavier than expected. Or the path may be calculated dynamically via motion planning that the original designer has no control over.

A standard solution is to observe the device acting in the field and see whether it is straining or overshooting its path parameters. If the user sees problems, he will reset the parameters of the device so that it moves more slowly. He may also go back to the design stage and redesign the motion paths by manually calculating the torques using CAD tools and redeploy a new path in the device's controller. In some cases, the user will replace the device with a new device that has joints built with stronger motors so that it can accomplish the task. Doing this requires reprogramming the new device to handle the task and a device with stronger motors will typically be more expensive.

SUMMARY

Embodiments of the present invention address and overcome one or more of the above shortcomings and drawbacks, by providing methods, systems, and apparatuses related to planning of motions to lift heavy objects using a simulation of the physical system. Briefly, the techniques described herein allows for a device to adjust its motion path automatically to add in considerations of mass and torque limitations.

According to some embodiments, a computer-implemented method for planning of motions to lift objects using a robot system includes a computer system receiving various items of input data. This input data includes (a) robot kinematics data describing a robot as a first set of rigid bodies and first set of joints connecting the first set of rigid bodies according to a first set of rotary positions, (b) robot mass data describing mass characteristics of each rigid body in the first set of rigid bodies, (c) end effector kinematics data describing to an end effector attached to the robot as a second set of rigid bodies and second set of joints connecting the second set of rigid bodies according to a second set of rotary positions, (d) end effector mass data describing mass characteristics of each rigid body in the second set of rigid bodies, (e) load mass data describing mass characteristics of a load, and (f) drive configuration data describing speed limits and torque limits corresponding to one or more drives operating the first set of joints and the second set of joints. The computing system applies a motion path searching algorithm to the input data to identify one or more feasible robot paths. The motion path searching algorithm uses the robot mass data, end effector mass data, and load mass data to determine speed and torque of each of the first set of joints and the second set of joints when evaluating points for inclusion in a feasible robot paths. An evaluated point is only included in a feasible robot path if the speed and torque of each of the first set of joints and the second set of joints do not exceed the speed limits and torque limits specified in the drive configuration data. The robot is operated using an updated robot path selected from the one or more feasible robot paths.

According to other embodiments, an article of manufacture for planning of motions to lift heavy objects using a robot system includes a non-transitory, tangible computer-readable medium holding computer-executable instructions for performing a method as follows. Data is identified including (a) rigid bodies included in the robot and the end effector of the robot system, (b) joints connecting the rigid bodies, and (c) torque limits for each of the joints. The torque limit for a joint indicates a maximum supported torque by a drive operating the joint. A motion path searching algorithm is applied to the input data to identify one or more feasible robot paths. The motion path searching algorithm determines torque of each of joint when evaluating points for inclusion in a feasible robot paths. An evaluated point is only included in a feasible robot path if the torque of each of the joints do not exceed the torque limits. At least one of the feasible robot paths is transferred to a controller associated with the robot.

According to some embodiments, a system for planning of motions to lift heavy objects using a robot includes a robot system, a controller, and a computing system. The robot system includes a robot, an end effector, and one or more loads. The controller controls the robot. The computing system is comprised of one or more processors configured to one or more of the methods discussed above. For example, in one embodiment, the processors apply a motion path searching algorithm to various input data to determine feasible robot paths. One or more of these paths are then transferred to the controller associated with the robot.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to the planning of robotic motions to lift heavy objects using a simulation of the physical system. Briefly, a service is provided to calculate a machine's path that accounts for the mass characteristics of the work products as well as the manipulating device such as a robot. The device is programmed in the usual method by providing the points and orientations of the path that the end effector will follow. The user may also be provided with a mass estimation tool for determining the mass properties of the device, its end effectors, as well as the work products being manipulated. The drive configuration data of the device's joints are also known, so that their torque characteristics can be accurately estimated. The service can be hosted on a cloud service and will calculate a new path for the device that accounts for the speeds and torques of the joint motors and selects speeds that prevent the device from overshooting. The path itself may also be changed so that joints can move with shorter moment arms to reduce torque. This recalculated path is inspected by the user, edited for compliance with the task, and then downloaded to the device to act as its motion path. The output path specifies state space data for all the device's joints as well as the path of the end effector in physical space. The input path may contain all state space data or may only specify the end effector path.

Figure 1:
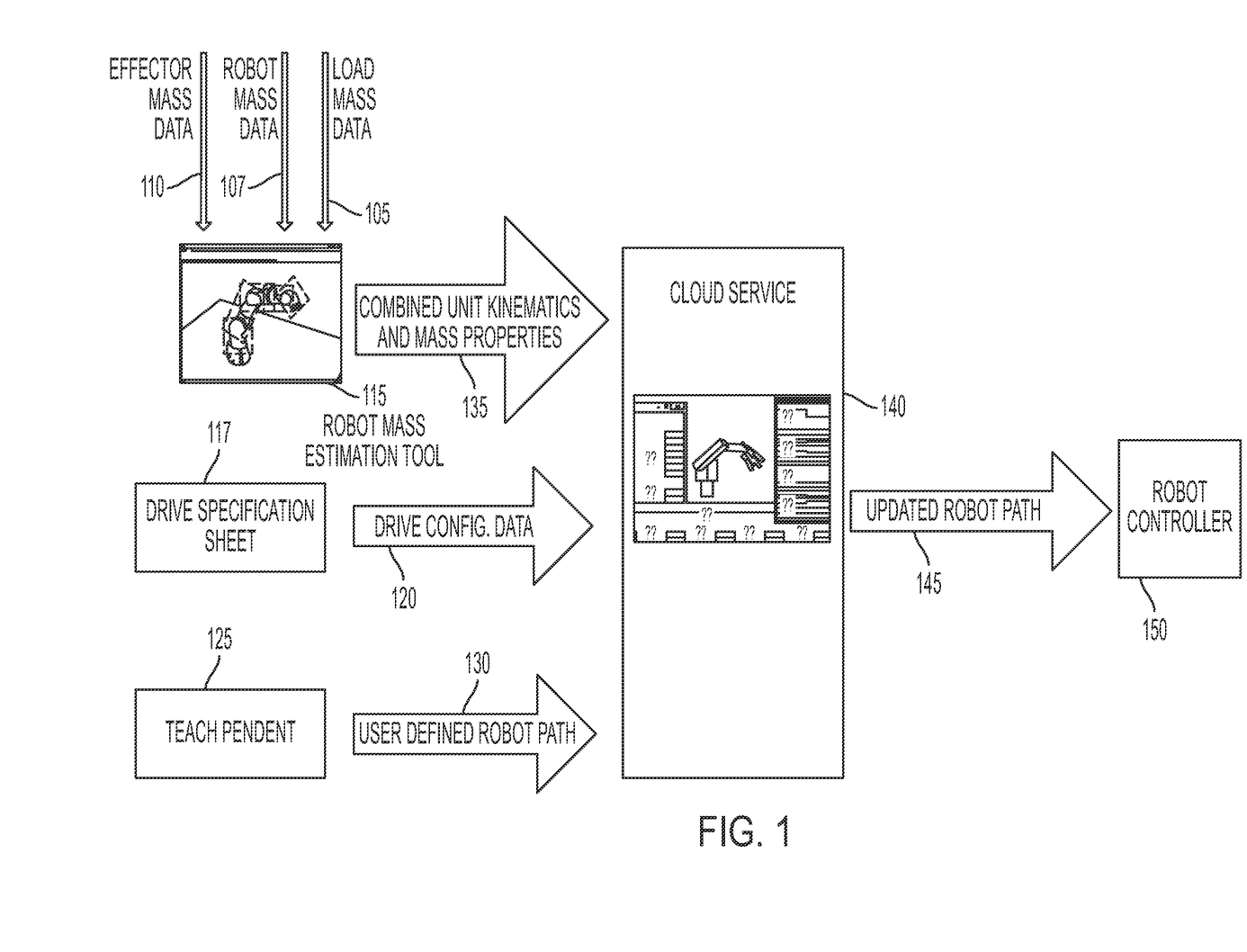
FIG. 1 illustrates a high-level overview of the process for determining a feasible robot path based on mass characteristics, according to some embodiments.

FIG. 1 illustrates a high-level overview of the process for determining a feasible robot path based on mass characteristics, according to some embodiments. For, the purposes of this discussion, the combination of the robot, the end effector, and the load is referred to as the "robot system." To summarize, a software service, referred to herein as the Cloud Service 140, receives input data related to the Combined Unit Kinematics and Mass Properties 135 of the robot system, Drive Configuration Data 120 describing the electronic drives of the robot system, and a User defined robot path 130. The Cloud Service adjusts the User defined robot path 130 as necessary to support the Combined Unit Kinematics and Mass Properties 135, thereby yielding a Updated Robot Path 145 that may then be uploaded to the Robot Controller 150.

The Robot Mass Estimation Tool 115 is used to combine known mass data into a format that is compatible with physical simulation. The Robot Mass Estimation Tool 115 is a software application executed on a desktop computer, a tablet, or any similar computing system generally known in the art. The input data to the Robot Mass Estimation Tool 115 includes Load Mass Data 105, Robot Mass Data 107, and Effector Mass Data 110. This input data may be entered into the Robot Mass Estimation Tool 115 by a user or, alternatively, the Robot Mass Estimation Tool 115 may retrieve the data from one or more databases. Each mass data input item describes the mass characteristics of an element of the robot system. The Robot Mass Estimation Tool 115 combines all the input data based on how the robot system is configured to yield a combined dataset comprising Combined Unit Kinematics 220 (in FIG. 2) describing the complete robot system, as well as the mass characteristics of each component of the robot system. This dataset is labeled in FIG. 1 as the Combined Unit Kinematics and Mass Properties 135.

The Robot Mass Estimation Tool 115 assigns mass and rotational mass (i.e., moment of inertia) to each independently moving part of the complete robot system, combining parts that may come from different sources to yield an estimate of the whole. For example, a robot may be specified separately from a gripper or other end effector, as well as separately from a work product. For the physical simulation performed by the Cloud Service 140 (see FIG. 3), the segments of the robot arm, the segments of the end effector, and the work product need to be combined since they become physically connected to one another during production, either because they are bolted together or one is holding the other such that they are physically coupled. As such, the Robot Mass Estimation Tool 115 analyzes the combined robot system, with the load provided by the work product, to determine the Combined Unit Kinematics and Mass Properties 135 that describe the complete robot system.

Figure 2:
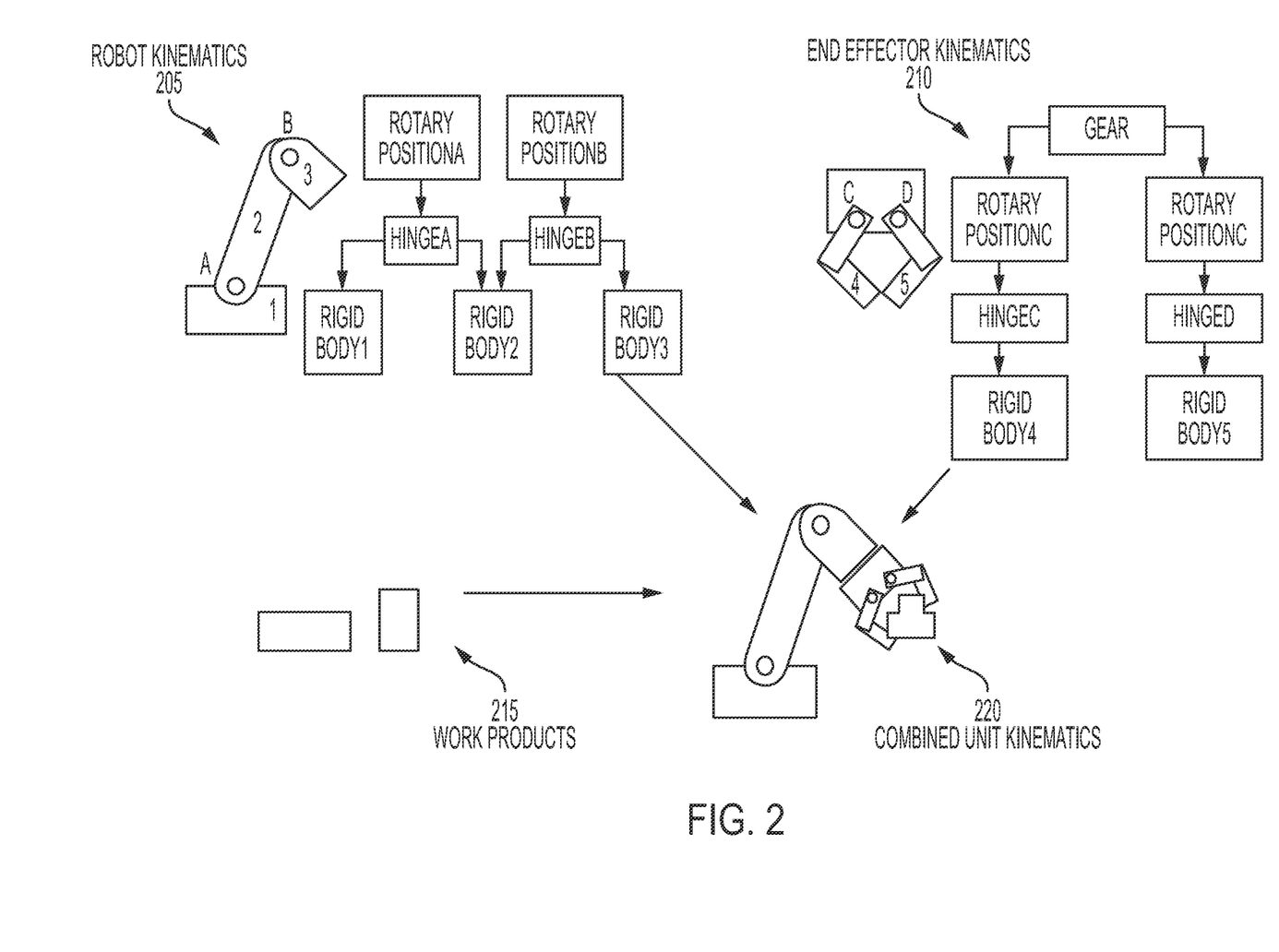
FIG. 2 provides an example of how kinematics for the robot system may be assembled, according to some embodiments.

The Robot Mass Estimation Tool 115 divides the robot into separate independently moving parts and determines Robot Kinematics 205 for the various positions that may be used during production. For example, a robot arm would be divided into its various arm segments because each arm segment moves independently from the rest. The Robot Mass Data 107 would then be specified with respect to each of these items. For example, FIG. 2 provides an example of how Robot Kinematics 205 may be derived for an example robot. Here the robot comprises three rigid bodies and two hinges. The three rigid bodies are labeled "Rigid 1," Rigid 2," and "Rigid 3," respectively. Example mass characteristics of each of these rigid bodies that may be specified in the Robot Mass Data 107 are provided in the Mass Properties 305 shown in FIG. 3. As shown in FIG. 2, the Robot Kinematics 205 describes these rigid bodies and hinges at two rotary positions. Various techniques generally known in the art may be used for storing the kinematic data in a format useable by the Cloud Service 140. For example, in one embodiment, kinematics are stored hierarchically in the Extensible Markup Language (XML) or a similar format.

The end effector of the robot system may be specified in a manner similar to the robot. FIG. 2 shows how End Effector Kinematics 210 may be derived for an example end effector. Here there are two rigid bodies (labeled "Rigid 4" and "Rigid 5," respectively) connected by two hinges (labeled "Hinge C," and "Hinge D," respectively). A gear included in the end effector positions the hinges and rigid bodies at one of two rotary positions. Example mass characteristics for the two rigid bodies are provided in the Mass Properties shown in FIG. 3.

The user may enter the rough mass of the Work Products 215 the Load Mass Data 105 and designate the overall manner in which the mass is distributed. Alternatively, for fully automated systems, this information can be derived using a database of known mass types and values. For rotational mass, the shape of the work product matters so it is not sufficient to treat the mass as a simple sphere or box. However, it may be sufficient to estimate the shape roughly and assume an even solid distribution of mass. For example, in one embodiment, the shape is estimated based on user selection of a three-dimensional shape approximating the work product. In other embodiments, an image depicting the work piece may be captured and provided to the Robot Mass Estimation Tool 115. Then, using general image processing techniques known in the art, the shape of the work product may be estimated by the Robot Mass Estimation Tool 115. For cases where the Load Mass Data 105 must be estimated more precisely, the user may be given the option of further subdividing the part's shape into more subparts and estimating the mass of the subparts. For example, if the robot arm contains a heavy drive train that runs up the center of the shaft, the user may opt to add a subpart for the drive train and another estimation for the arm's exterior shell.

The robot system includes one or more motors that generate the rotational or linear force used move the robot system into different positions. The electrical energy sent to the motor(s) is controlled by drives. More specifically, the drive provides electricity to the motor(s) in varying amounts and frequencies to control the motor's speed and torque. The data on the drive's torque and speed characteristics is labeled Drive Configuration Data 120 in FIG. 1. These characteristics describe the limits of the drives and may be specified, for example, as a speed-torque curve that describes the relationship between the speed and the torque produced by the motor or in a table of values. This Drive Configuration Data 120 can be determined, for example, from the Drive Specification Sheet 117. Preferably, such data could be read out of the computing device operating the Robot Mass Estimation Tool 115 (or another computing device electronically); however, if the data is not available electronically, the data may be provided at device integration time when the application is being installed.

The path that the robot follows (i.e., the User defined robot path 130 in FIG. 1) may be specified by a user using a Teach Pendent 125. As is generally understood in the art, a teach pendent is a handheld device (e.g., touchscreen tablet) that may be used to remotely control an industrial robot in order to program it. To program the robot, the user moves different components of the robot physically to each position where the user wants them to be for the application in conjunction with the graphical user interface (GUI) of the Teach Pendent 125, and the joint angles at each position are recorded. It would be assumed that the ending position is the most critical as that is where the device meets the objects it is intended to manipulate. The teach points of the User defined robot path 130 could also be entered manually or derived automatically from a path planning algorithm such as from a CAD/Computer Automated Manufacturing (CAM) tool. The teach points could also be further augmented by noting which points are critical such that the device must actually reach that position and orientation exactly.

In the example of FIG. 1, the Cloud Service 140 is a software application operated remotely from the production environment. In general, the Cloud Service 140 can be implemented using any hardware or software system that allows direct integration with the automation system in which the robot system operates. For example, in one embodiment, the Cloud Service 140 is implemented using a closed-based operating system that connects plants, systems, and machines (e.g., Siemens MindSphere™). It should be noted that, although the Cloud Service 140 is referred to as "cloud-based," herein, the service does not necessarily need to be executed in a cloud-based computing environment. For example, in other embodiments, the service is executed within the Robot Controller 150 itself, or it could be performed at design time as an add-in for CAD software.

Though not shown in FIG. 1, the operator may also provide the Cloud Service 140 with geometric data for obstacles in the production environment to perform collision avoidance. For example, in one embodiment, the operator provides a map of the factory floor that depicts the placement of all known objects. Normally, a robot is programmed manually such that its path avoids obstacles by default. Since the path does not change, if the obstacles do not move, the robot will continue to avoid them. Because the system described herein allows the User defined robot path 130 to be modified to some degree, knowing where there are external obstacles will supplement the path search process so that a newly generated path will also avoid those obstacles.

The Cloud Service 140 calculates one or more speed curves for the given loads or path using a physical simulation of the robot system. This process is described in more detail below with respect to FIG. 3. Each speed curve describes the speed of the robot with respect to the User defined robot path 130 with or without adjustments. The speed curve that provides the fastest traversal of the path is selected and the corresponding adjustments are used to create a Updated Robot Path 145. The Updated Robot Path 145 is then uploaded to the Robot Controller 150, either directly via the Cloud Service 140 or through one or more intermediary devices. For example, in one embodiment, the Updated Robot Path 145 is transferred to the Teach pendent 125 which, in turn, transfers it to the Robot Controller 150.

Figure 3:
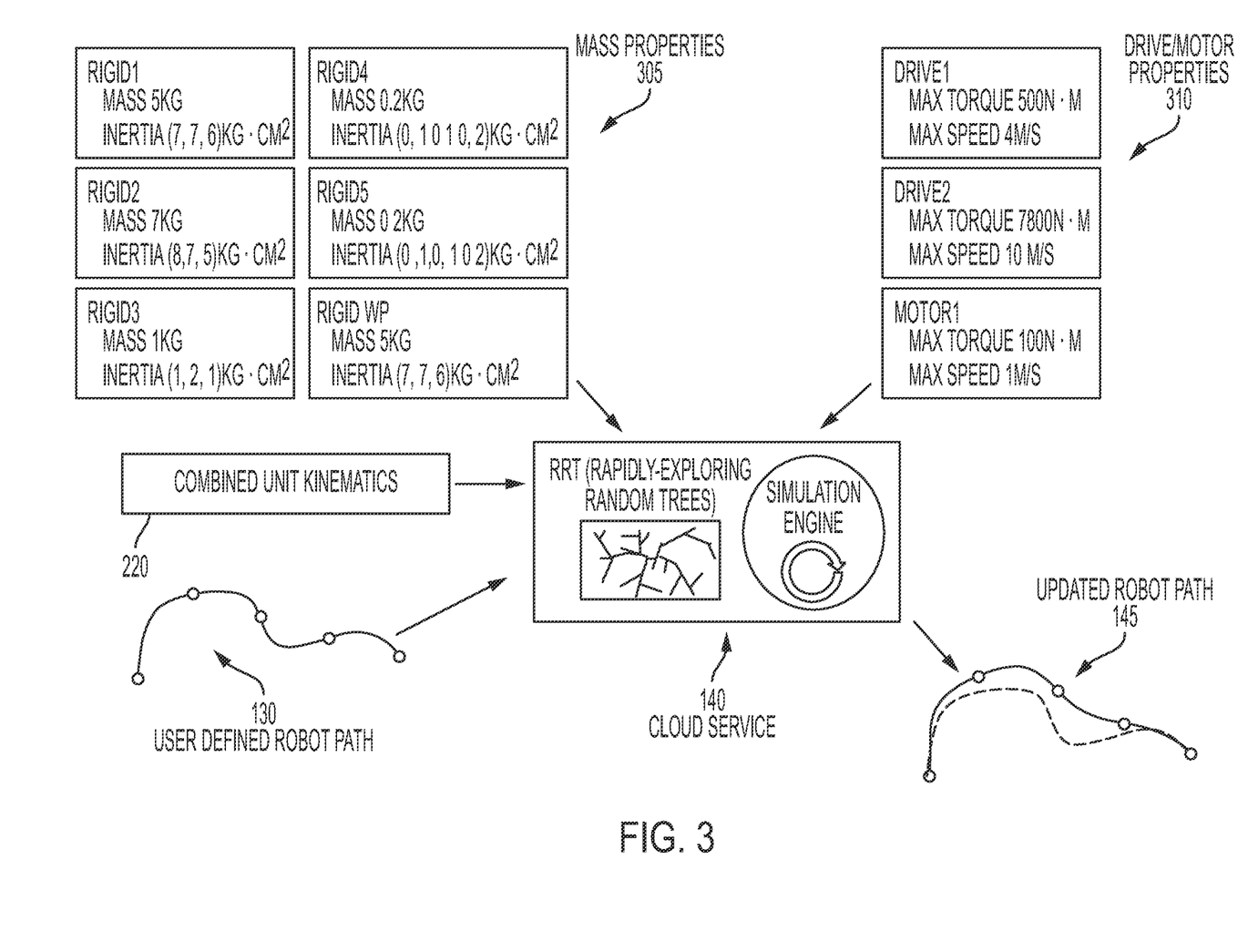
FIG. 3 shows a data-oriented view of process that occurs in the cloud service to compute feasible path, according to some embodiment.

FIG. 3 shows a data-oriented view of the process that occurs in the service to compute the feasible path, according to some embodiments. This example illustrates the calculation process used to determine a path that accounts for mass properties. As discussed above with reference to FIG. 1, the Cloud Service 140 receives inputs including the Combined Unit Kinematics 220, the User Defined Robot Path 130, the Mass Properties 305, and the Drive/Motor Properties 310.

The Cloud Service 140 determines the Updated Robot Path 145 using a motion path searching algorithm such as RRT (Rapidly-exploring Random Trees) or any other similar algorithm known in the art. In the usual implementation of RRT, the search space is set to be the same as the joint space of the robot system. For example, if the robot system has six rotary joints, the RRT search space has six corresponding dimensions. For the Cloud Service 140, more dimensions are added including the speed of the joints. This increases the space of the search, but also allows for greater diversity in the final solution. The criterion of the search for ordinary RRT is whether or not the robot system's path is blocked for a given joint configuration. This criterion is normally satisfied if the position of the robot system and its associated part geometries are not colliding with the geometric shape of obstacles in the space. However, with the techniques described herein, the criteria for success may be more detailed. Not only must the space be clear of obstacles, but also the speed and torque of the joints must be kept within the limits of the drives corresponding to the joints. As an alternative to RRT, other search methods generally known in the art may be used to find the motion paths including, without limitation, cell decomposition methods and probabilistic road maps.

To calculate the torque being applied to a joint, the Cloud Service 140 may use a constraint solver in a physical simulation engine. The purpose of a physics engine is to determine forces in a set of kinematic constraints that would be sufficient to hold the joints together and not cause the mechanism to split apart. The positions and speeds of the moving parts are taken from the search space and a curve in the search space represents a transition from one position to another at a particular acceleration. If a single speed dimension is used, then all joints are assumed to move at a speed relative to their change in value so that all joints would reach their end point simultaneously. If speeds are assigned for each joint, then the joints would move at different speeds, reaching their end states at different times. For a given set of positions and speeds, the data is set into the constraint solver of the physics engine to determine what forces and torques are needed to achieve that state. If the values are too high for the drives being employed, then that acts as a barrier and the device path cannot move into that state. In some embodiments, the simulation engine could be replaced with a different method for calculating the torques such as a table lookup. Various types of constraint solvers known in the art may be employed with the physical simulation engine including, for example, Sequential Impulses.

The starting and ending state of the device path can have known speeds associated with the known positions such as starting and stopping the path with zero speeds. The User Defined Robot Path 130 may be used as a first guess for how to move the device to achieve the path and so that the search process only needs to fill in the speed values to find a feasible path with mass properties. If no such feasible path is discovered, then training points may be adjusted to find other ways to move the device that would be feasible.

As a final step, the user may be informed of the Updated Robot Path 145 before installing the path into the device controller. For example, in some embodiments, the Updated Robot Path 145 may be presented on the Teach pendent 125, a Human Machine Interface (HMI) station, or other GUI accessible within the production environment (not shown in FIG. 1). In this case, the user may be provided with an editor that allows the Updated Robot Path 145 to be shifted or otherwise edited so that the Updated Robot Path 145 follows a direction that the user determines is better. Once the Updated Robot Path 145 is revised, this new data may be passed to the Cloud Service 140 again as a new user trained path and the Cloud Service 140 may determine if the new path is feasible. If not, the user may be informed and have the option to try a different set of points and speeds.

One distinction of the systems and methods described herein over conventional solutions is the manner in which mass properties are incorporated into the search process for finding feasible motion paths. Conventional search algorithms only consider the overall position of the device and what geometric objects it overlaps in space in that position. The systems and methods described herein also provides a means to include speed and a means to calculate forces and torques on the system by using physical simulation. Although pure spatial geometry is also a kind of physical simulation, the Cloud Service 140 includes the dynamical aspect of physical motion and not just the aspect of occupying space. One inventive step is the inclusion of the physical simulation engine in the Cloud Service 140 to act as a constraint solver in order to efficiently calculate the dynamical properties for a given configuration of joints and speeds.

Additionally, the Cloud Service 140 described herein allows for the automatic determination of motion paths with speeds that do not overly burden the motors and drives of an actuated device. When using the Cloud Service 140, undesired motions such as overshooting can be avoided without requiring the application programmer to perform an analysis manually. This can lead to cost savings for the integrator and robot system user because the system will perform motions at higher speeds that are correct and do not strain the motors.

The Cloud Service 140 discussed herein can also be used to size drives for a given device. Because the maximum torques for a motion path can be limited, the system developer can select drives that achieve the desired performance speed while minimizing the amount of torque the system needs. Drives with lower maximum torques are generally less costly than drives that produce higher torques.

Figure 4:
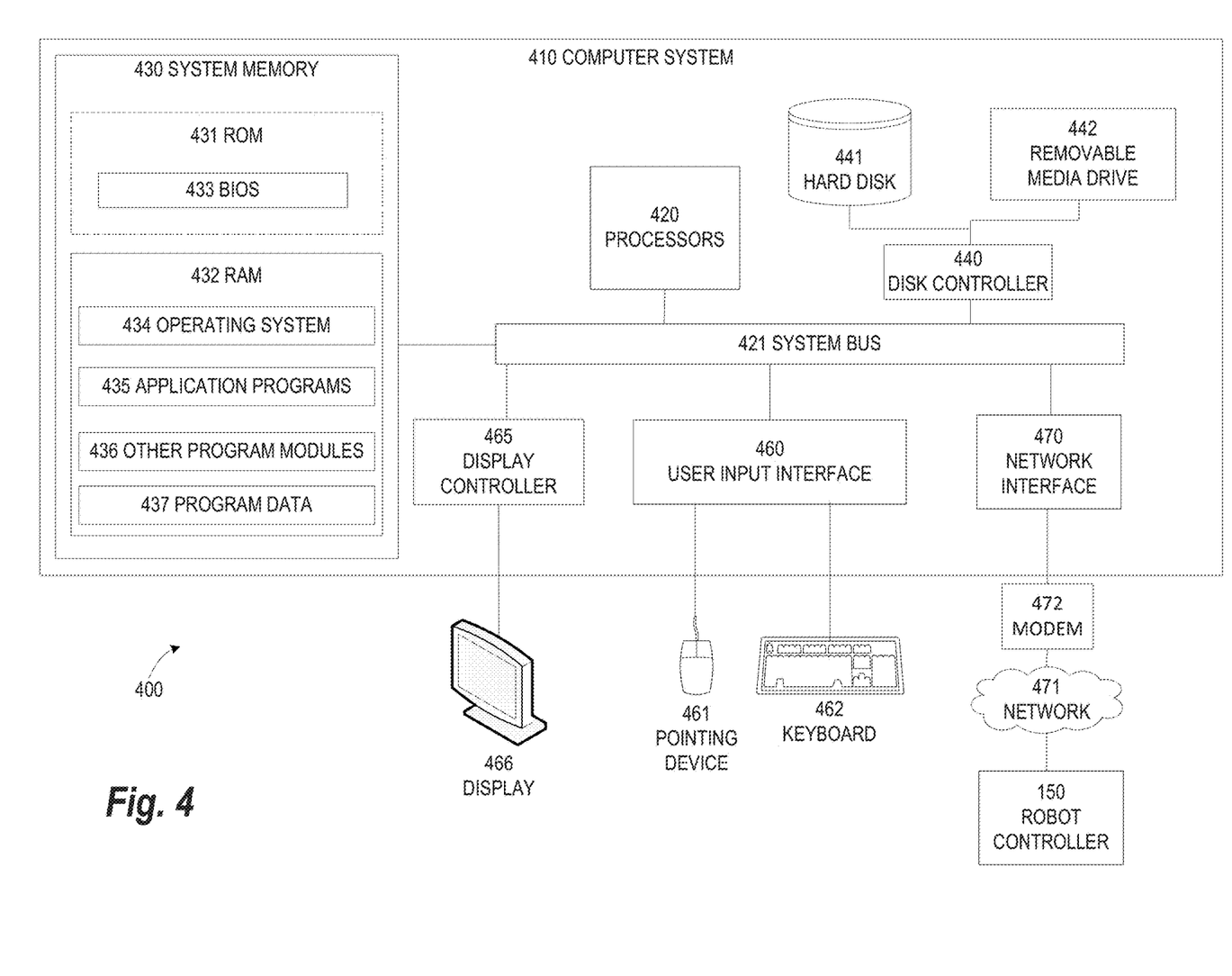
FIG. 4 illustrates an exemplary computing environment within some embodiments of the present invention may be implemented.

FIG. 4 illustrates an exemplary computing environment 400 within which the Cloud Service 140 may be implemented. The computing environment 400 includes computer system 410, which is one example of a computing system upon which embodiments of the invention may be implemented. Computers and computing environments, such as computer system 410 and computing environment 400, are known to those of skill in the art and thus are described briefly herein.

As shown in FIG. 4, the computer system 410 may include a communication mechanism such as a bus 421 or other communication mechanism for communicating information within the computer system 410. The computer system 410 further includes one or more processors 420 coupled with the bus 421 for processing the information. The processors 420 may include one or more central processing units (CPUs), graphical processing units (GPUs), or any other processor known in the art.

The computer system 410 also includes a system memory 430 coupled to the bus 421 for storing information and instructions to be executed by processors 420. The system memory 430 may include computer readable storage media in the form of volatile and/or nonvolatile memory, such as read only memory (ROM) 431 and/or random access memory (RAM) 432. The system memory RAM 432 may include other dynamic storage device(s) (e.g., dynamic RAM, static RAM, and synchronous DRAM). The system memory ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system (BIOS) 433 contains the basic routines that help to transfer information between elements within computer system 410, such as during start-up, may be stored in ROM 431. RAM 432 may contain data and/or program modules that are immediately accessible to and/or presently being operated on by the processors 420. System memory 430 may additionally include, for example, operating system 434, application programs 435, other program modules 436 and program data 437. The application programs 435 may include, for example, the one or more executable applications corresponding to the Cloud Service 140.

The computer system 410 also includes a disk controller 440 coupled to the bus 421 to control one or more storage devices for storing information and instructions, such as a hard disk 441 and a removable media drive 442 (e.g., compact disc drive, solid state drive, etc.). The storage devices may be added to the computer system 410 using an appropriate device interface (e.g., a small computer system interface (SCSI), integrated device electronics (IDE), Universal Serial Bus (USB), or FireWire).

The computer system 410 may also include a display controller 465 coupled to the bus 421 to control a display 466, such as a liquid crystal display (LCD), for displaying information to a computer user. The computer system includes an input interface 460 and one or more input devices, such as a keyboard 462 and a pointing device 461, for interacting with a computer user and providing information to the processors 420. The pointing device 461 may be, for example, a mouse or a pointing stick for communicating direction information and command selections to the processors 420 and for controlling cursor movement on the display 466. The display 466 may provide a touch screen interface which allows input to supplement or replace the communication of direction information and command selections by the pointing device 461.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium, such as a hard disk 441 or a removable media drive 442. The hard disk 441 may contain one or more datastores and data files used by embodiments of the present invention. Datastore contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processor 420 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 441 or removable media drive 442. Non-limiting examples of volatile media include dynamic memory, such as system memory 430. Non-limiting examples of transmission media include coaxial cables, copper wire, and fiber optics, including the wires that make up the bus 421. Transmission media may also take the form of acoustic or light waves, such as those generated during radio wave and infrared data communications.

When used in a networking environment, computer system 410 may include modem 472 for establishing communications with the Robot Controller 150 or a remote computing system over a network 471, such as the Internet. Modem 472 may be connected to bus 421 via user network interface 470, or via another appropriate mechanism. It should be noted that, although the Robot Controller 150 is illustrated as being connected to the computer system 410 over the network 471 in the example presented in FIG. 4, in other embodiments of the present invention, the computer system 410 may be directly connected to the Robot Controller 150. For example, in one embodiment the computer system 410 and the Robot Controller 150 are co-located in the same room or in adjacent rooms, and the devices are connected using any transmission media generally known in the art.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., robot controller 150). The network 471 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) the element is expressly recited using the phrase "means for."

I claim:

1. A computer-implemented method for planning of motions to lift objects using a robot system, the method comprising:
    receiving, by a computing system, input data comprising:
        robot kinematics data describing a robot as a first set of rigid bodies and first set of joints connecting the first set of rigid bodies according to a first set of rotary positions,
        robot mass data describing mass characteristics of each rigid body in the first set of rigid bodies,
        end effector kinematics data describing an end effector attached to the robot as a second set of rigid bodies and second set of joints connecting the second set of rigid bodies according to a second set of rotary positions,
        end effector mass data describing mass characteristics of each rigid body in the second set of rigid bodies;
        load mass data describing mass characteristics of a load;
        drive configuration data describing speed limits and torque limits corresponding to one or more drives operating the first set of joints and the second set of joints;
    applying, by the computing system, a motion path searching algorithm to the input data to identify one or more feasible robot paths, wherein:
        (a) the motion path searching algorithm uses the robot mass data, end effector mass data, and load mass data to determine speed and torque of each of the first set of and the second set of joints when evaluating points for inclusion in the one or more feasible robot paths, wherein the torque is determined using a constraint solver in a physical simulation engine, and
        (b) an evaluated point is only included in the one or more feasible robot paths if the speed and torque of each of the first set of and the second set of do not exceed the speed limits and torque limits specified in the drive configuration data; and
    operating the robot using an updated robot path selected from the one or more feasible robot paths.

2. The method of claim 1, further comprising:
    transferring the updated robot path from the computing system to a controller associated with the robot.

3. The method of claim 1, further comprising:
    transferring the updated robot path from the computing system to a teach pendent associated with the robot.

4. The method of claim 1, wherein the input data further comprises a robot path describing motion of the robot while moving the load and the robot path is used to initialize the motion path searching algorithm.

5. The method of claim 1, wherein the torque of each of the first set of joints and the second set of joints at the point is determined by:
    determining a first position and a first speed for each of the joints at a prior point being evaluated for connection to the evaluated point;
    determining a second position and a second speed for each of the joints at the evaluated point;
    determining the torque based on (a) the robot mass data, the end effector mass data, the load mass data, and (b) the acceleration resulting from the transition between (i) the first position and the first speed and (ii) the second position and the second speed.

6. The method of claim 5, wherein each joint has identical values for the first speed and the second speed.

7. The method of claim 5, wherein each joint has distinct values for the first speed and the second speed.

8. The method of claim 1, wherein the motion path searching algorithm is Rapidly-exploring Random Trees (RRT).

9. The method of claim 1, further comprising:
    prior to operating the robot using the updated robot path, modifying the updated robot path based on one or more modifications provided by a user.

10. An article of manufacture for planning of motions to lift objects using a robot system comprising a robot and an end effector, the article of manufacture comprising a non-transitory, tangible computer-readable medium holding computer-executable instructions for performing a method comprising:
    identifying (a) a plurality of rigid bodies included in the robot and the end effector, (b) a plurality of joints connecting the rigid bodies, and (c) torque limits for each of the joints, wherein the torque limit for a joint indicates a maximum supported torque by a drive operating the joint;
    applying a motion path searching algorithm to received input data to identify one or more feasible robot paths, wherein:
        (a) using a constraint solver in a physical simulation engine, the motion path searching algorithm determines torque of each joint when evaluating points for inclusion in the one or more feasible robot paths, and
        (b) an evaluated point is only included in the one or more feasible robot paths if the torque of each of the joints do not exceed the torque limits; and
    transferring at least one of the one or more feasible robot paths to a controller associated with the robot.

11. The article of manufacture of claim 10, wherein the method further comprises:
    receiving a robot path describing motion of the robot while moving the load; and
    using the robot path in the motion path searching algorithm.

12. The article of manufacture of claim 10, wherein the torque of each joint at the evaluated point is determined by:
    determining mass properties of each of the rigid bodies;
    determining a first position and a first speed for each of the joints at a prior point being evaluated for connection to the evaluated point;
    determining a second position and a second speed for each of the joints at the evaluated point;
    determining the torque based on the mass properties of the rigid bodies and the acceleration resulting from the transition between (a) the first position and the first speed and (b) the second position and the second speed.

13. The article of manufacture of claim 12, each joint has identical values for the first speed and the second speed.

14. The article of manufacture of claim 12, each joint has distinct values for the first speed and the second speed.

15. The article of manufacture of claim 10, wherein the motion path searching algorithm is Rapidly-exploring Random Trees (RRT).

16. A system for planning of motions to lift objects using a robot, the system comprising:
    a robot system comprising a robot, an end effector, and one or more loads;
    a controller associated with the robot;
    a computing system comprising one or more processors configured to:
        identify (a) a plurality of rigid bodies included in the robot and the end effector, (b) a plurality of joints connecting the rigid bodies, and (c) torque limits for each of the joints, wherein the torque limit for a joint indicates a maximum supported torque by a drive operating the joint;
        apply a motion path searching algorithm to received input data to identify one or more feasible robot paths, wherein:
            (a) using a constraint solver in a physical simulation engine, the motion path searching algorithm determines torque of each of joint when evaluating points for inclusion in the one or more feasible robot paths, and
            (b) an evaluated point is only included in the one or more feasible robot paths if the torque of each of the joints do not exceed the torque limits; and
        transfer at least one of the one or more feasible robot paths to the controller associated with the robot.

* * * * *